United States Patent [19]

Flockenhaus et al.

[11] Patent Number: 4,950,473
[45] Date of Patent: Aug. 21, 1990

[54] METHOD FOR REDUCING NITROGEN OXIDES IN FLUE GAS

[75] Inventors: Claus Flockenhaus; Manfred Galow; Klaus Merkel, all of Essen; Hans-Eugen Bühler, Königstein; Hartmut Kainer, Wiesbaden, all of Fed. Rep. of Germany

[73] Assignees: Didier Engineering GmbH, Essen; Didier-Werke AG, Wiesbaden, both of Fed. Rep. of Germany

[21] Appl. No.: 263,470

[22] Filed: Oct. 27, 1988

[30] Foreign Application Priority Data

Oct. 27, 1987 [DE] Fed. Rep. of Germany ....... 3736306

[51] Int. Cl.$^5$ ........................... C01B 21/00; B01J 8/00
[52] U.S. Cl. .................................... 423/235; 423/239; 422/62
[58] Field of Search .................... 423/235, 235 D, 239, 423/239 A; 422/62

[56] References Cited

U.S. PATENT DOCUMENTS 4,473,536 9/1984 Carberg et al. ...................... 423/235
4,473,537 9/1984 Ford et al. ........................... 423/235
4,565,679 1/1986 Michalak et al. ................... 423/235
4,735,785 4/1988 Eichholtz et al. ................... 423/235

FOREIGN PATENT DOCUMENTS 119326 7/1983 Japan .

Primary Examiner—Gregory A. Heller
Attorney, Agent, or Firm—Nils H. Ljungman

[57] ABSTRACT

Apparatus and method for reducing nitrogen oxides in flue gas within a flue gas duct includes a number of distributor tubes for the injection of a reducing agent into the flue gas within the duct. Each distributor tube includes a control valve to be able to set an appropriate injection of the reducing agent to respond to different concentrations of the nitrogen oxides within the flue gas over the cross section of the flue gas duct. Each distributor tube comprises at least two parallel distributor tube segments which extend from opposite sides of the flue gas duct to the center of the flue gas duct. The two parallel distribution tube segments include a plurality of openings along the lengths thereof to supply the reducing agent generally evenly throughout their aligned portions of the cross section. The control valve is employed to adjust the reducing agent to provide the proper quantity thereof which corresponds to the particular concentration of nitrogen oxides within the flue gas at each corresponding portion of the entire cross section.

18 Claims, 3 Drawing Sheets

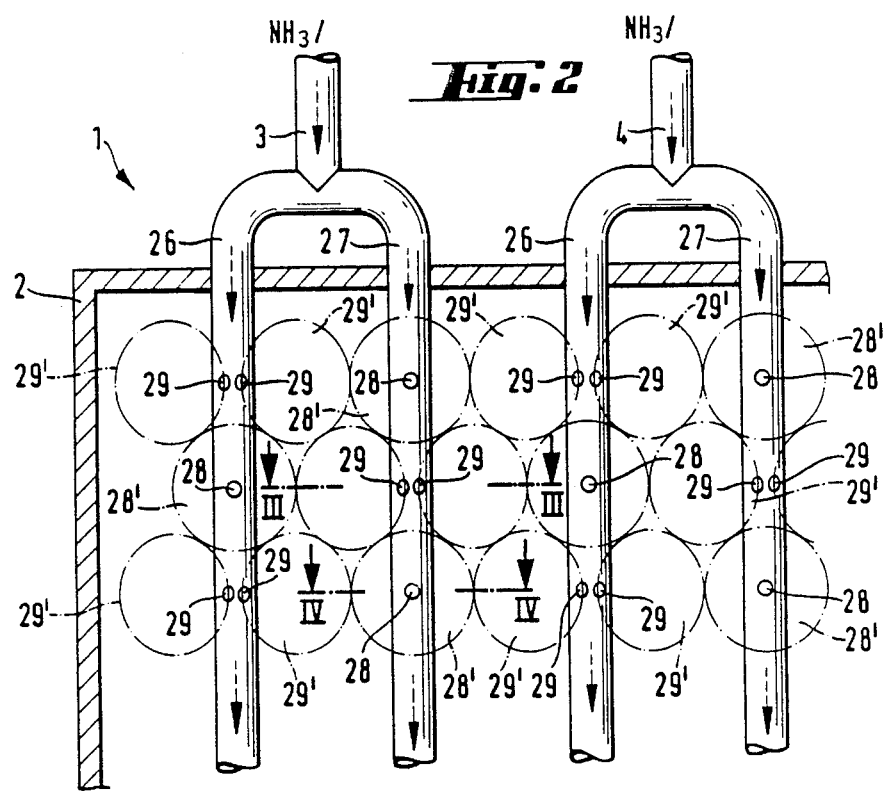
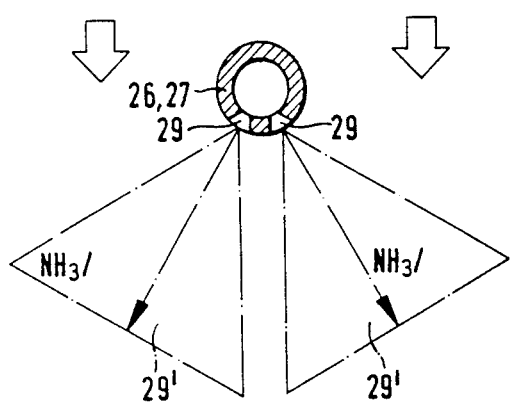
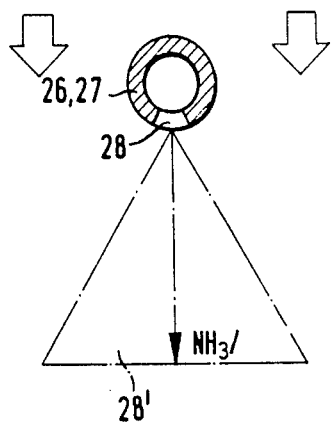

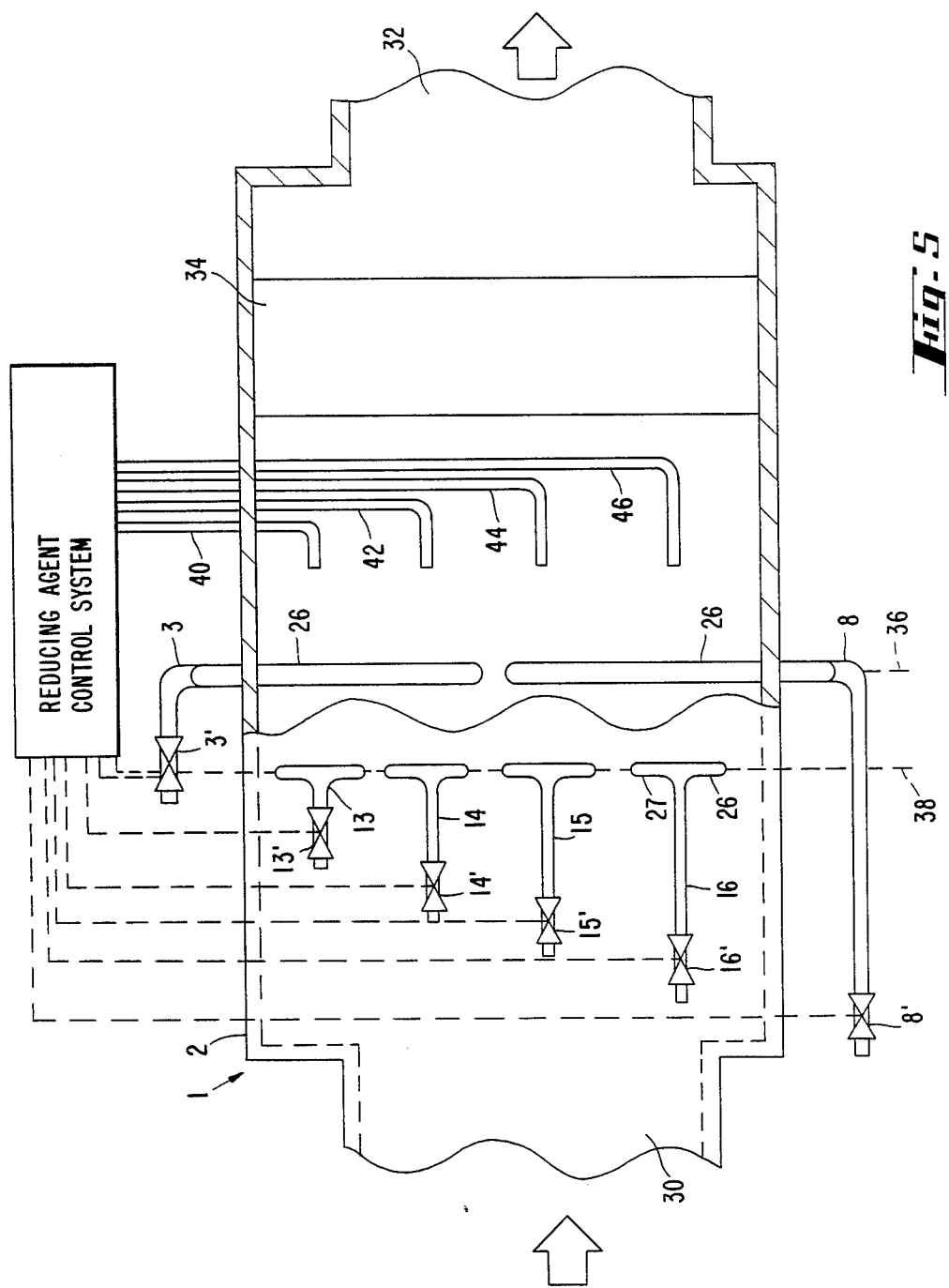

METHOD FOR REDUCING NITROGEN OXIDES IN FLUE GAS

BACKGROUND OF THE INVENTION

1. Field of the Invention

This invention relates to an apparatus and method for the treatment of a flue gas, in particular for the reduction of nitrogen oxides within the flue gas. The apparatus includes a number of distributor tubes with nozzle openings for the injection of a reducing agent, in particular ammonia, whereby the distributor tubes are distributed in at least one cross-sectional plane of the flue gas duct and are each connected by means of a control valve with feed lines.

2. Description of the Prior Art

In such flue gas ducts of the prior art, each distributor tube extends over the entire width of the flue gas duct. Accordingly, when the control valve of the distributor tube is opened, reducing agent is injected over the entire width of the flue gas duct. Generally, to reduce concentrations of nitrogen oxides ($NO_x$) in flue gas, the most commonly used process is selective catalytic reduction (SCR) on plate-shaped or grid-shaped catalyst bodies, in which ammonia ($NH_3$)-sometimes premixed with air-or another reducing agent is added in measured quantities to the flue gas.

It has been shown that during the operation of a flue gas duct, the nitrogen oxides are not uniformly distributed in the flue gas, but that there are non-uniform nitrogen oxide concentrations over the cross section of the flue gas duct. As a rule, there are local fluctuations in the $NO_x$ concentrations, the flue gas velocities and the oxygen concentrations. Moreover, it should be recalled that in large combustion facilities, for example, the flue gas duct cross section can be up to 100 square meters. Therefore, a dosing apparatus is required which makes it possible to dose the locally required amount of reducing agent for such large flows of flue gas throughout the duct cross section.

If, as in some prior art systems, the reducing agent is injected uniformly into such "uneven spots" in the concentration, the result is an uneven catalyst action, since there is not one Mol of nitrogen oxide for one Mol of reducing agent in all areas.

A number of U.S. patents disclose systems wherein a reducing agent is utilized to remove nitrogen oxides from flue gas or exhaust gases with the aid of a catalyst. Some of these patents are directed to the physical construction of the catalyst and to other features intended for effective removal of the nitrogen oxides. Such U.S. patents include U.S. Pat. No. 4,672,052 entitled "Catalyst for Removal of Nitrogen Oxides from Exhaust Gases"; U.S. Pat. No. 4,695,559 entitled "Catalyst for the Selective Reduction of Nitrogen Oxides in Waste Gases and Process for the Manufacture of Such a Catalyst"; U.S. Pat. No. 4,720,376 entitled "Process for the Removal of Nitrogen Oxides and Soot from Exhaust Gases of Machines and Combustion Installations Burning Heavy Fuel Oil"; No. U.S. Pat. 4,721,699 entitled "Catalyst for the Separation of Nitrogen Oxides from Combustion Exhaust Gases"; U.S. Pat. No. 4,742,036 entitled "Catalyst Plate"; No. U.S. Pat. 4,758,410 entitled "Cartridge for Catalyst Plates"; and U.S. Pat. No. 4,760,047 entitled "Catalyst Block". These patents are incorporated by reference as if they were set forth herein in their entirety.

OBJECT OF THE INVENTION

The object of the invention is to provide apparatus and method for reducing nitrogen oxides in flue gas, in which, when there is a zonally different flue gas or nitrogen oxide concentration over the cross section of the flue gas duct, it is possible to introduce correspondingly different concentrations of a reducing agent such as, for example, ammonia.

SUMMARY OF THE INVENTION

These and other objects of the invention are provided in a preferred embodiment thereof including a method of reducing nitrogen oxides in flue gas by the flowing of the flue gas through a flue gas duct having at least one cross section. An additional step includes determining an effective concentration of the nitrogen oxides within the flue gas in each predetermined portion of a plurality of predetermined portions which combine to form the cross section. The method includes distributing a reducing agent into the flue gas flowing through each predetermined portion of the cross section and controlling a quantity of the reducing agent distributed to each predetermined portion which quantity corresponds to the effective concentration of the nitrogen oxides in the predetermined portion. Additionally, there is the step of passing the flue gas with the reducing agent therein to a catalytic device downstream of the cross section to cause the quantity of the reducing agent to reduce the effective concentration of the nitrogen oxides in the flue gas.

Other objects of the invention are provided in a preferred embodiment thereof including apparatus for reducing nitrogen oxides in flue gas wherein the flue gas flows through a flue gas duct which includes a catalytic device mounted therein. The flue gas duct has at least one cross section upstream of the catalytic device which cross section includes a plurality of predetermined portions. The flue gas includes an effective concentration of nitrogen oxides associated with each one of the predetermined portions of the cross section. The apparatus includes a device for introducing the reducing agent to each one of the predetermined portions of the cross section. The device for introducing the reducing agent includes adjustment elements for controlling the quantity of the reducing agent introduced to each one of the predetermined portions. The quantity of the reducing agent introduced to each one of the predetermined portions corresponds to the effective concentration of the nitrogen oxides for reduction thereof in the catalytic device. The reducing agent is introduced by at least one distributor feed line corresponding to each one of the predetermined portions. The distributor feed line includes at least two distribution tube segments located within the flue gas duct in general alignment with the predetermined portions. The distribution tube segments are parallel with each other and extend from a side of the flue gas duct to terminate at a central region thereof. The distribution tube segments include a plurality of openings for discharge of the reducing agent and the openings are generally disposed along the distribution tube segments to cause the quantity of reducing agent to be generally evenly dispersed into the flue gas throughout the predetermined portion of the cross section.

Other objects of the invention are achieved by means of apparatus of the type described above, in which each distributor feed line or tube comprises at least two parallel distribution tube segments, which are connected to the same control valve. The distribution tube segments extend from the sides of the flue gas duct to its center. The two parallel distribution tube segments branch off in a fork-like fashion from the control valve.

The result is that each pair of distribution tube segments can cover not a straight-line, narrow zone over the entire width of the flue gas duct, but a broader, shorter zone with reducing agent, which zone extends only to the center of the cross section of the flue gas duct. By means of an appropriate adjustment of the control valves, the distribution of the reducing agent can thereby be suited to the current, local concentration of the nitrogen oxides in the flue gas.

In one configuration of the invention, a further variability of the injection of the reducing agent is achieved in that additional distribution tube segments in an upstream, neighboring cross-sectional plane of the flue gas duct run crossways to the distribution tube segments running in a first cross-sectional plane. There are distributor tubes in one cross-sectional plane which have more distribution tube segments than the distributor tubes of a neighboring cross-sectional plane.

To achieve the maximum coverage of the flow within the cross-sectional area between the distribution tube segments, the distribution tube segments have some nozzle openings which are oriented in the direction of flow of the flue gas and additional nozzle openings which are oriented at an acute angle to the direction of flow. The former nozzle openings and the latter nozzle openings, which are arranged in pairs, alternate in the longitudinal direction of the tube segment. The nozzle openings of the one tube segment are offset from the nozzle openings of the other tube segment. The distance between the tube segments and the arrangement of their nozzle openings are configured so that the injection covers the spaces between the tube segments of each distributor tube and the neighboring distributor tubes.

BRIEF DESCRIPTION OF THE DRAWINGS

FIG. 2 shows an enlarged partial view of a portion of the distribution tube segments of the invention.

FIG. 3 shows a cross section as seen along Line 3—3 in FIG. 2.

FIG. 4 shows a cross section as seen along Line 4—4 in FIG. 2.

FIG. 5 shows a schematic, fragmentary side view of the flue gas duct generally shown in FIG. 1 including additional features of the invention.

DESCRIPTION OF THE PREFERRED EMBODIMENTS

Figure 1:
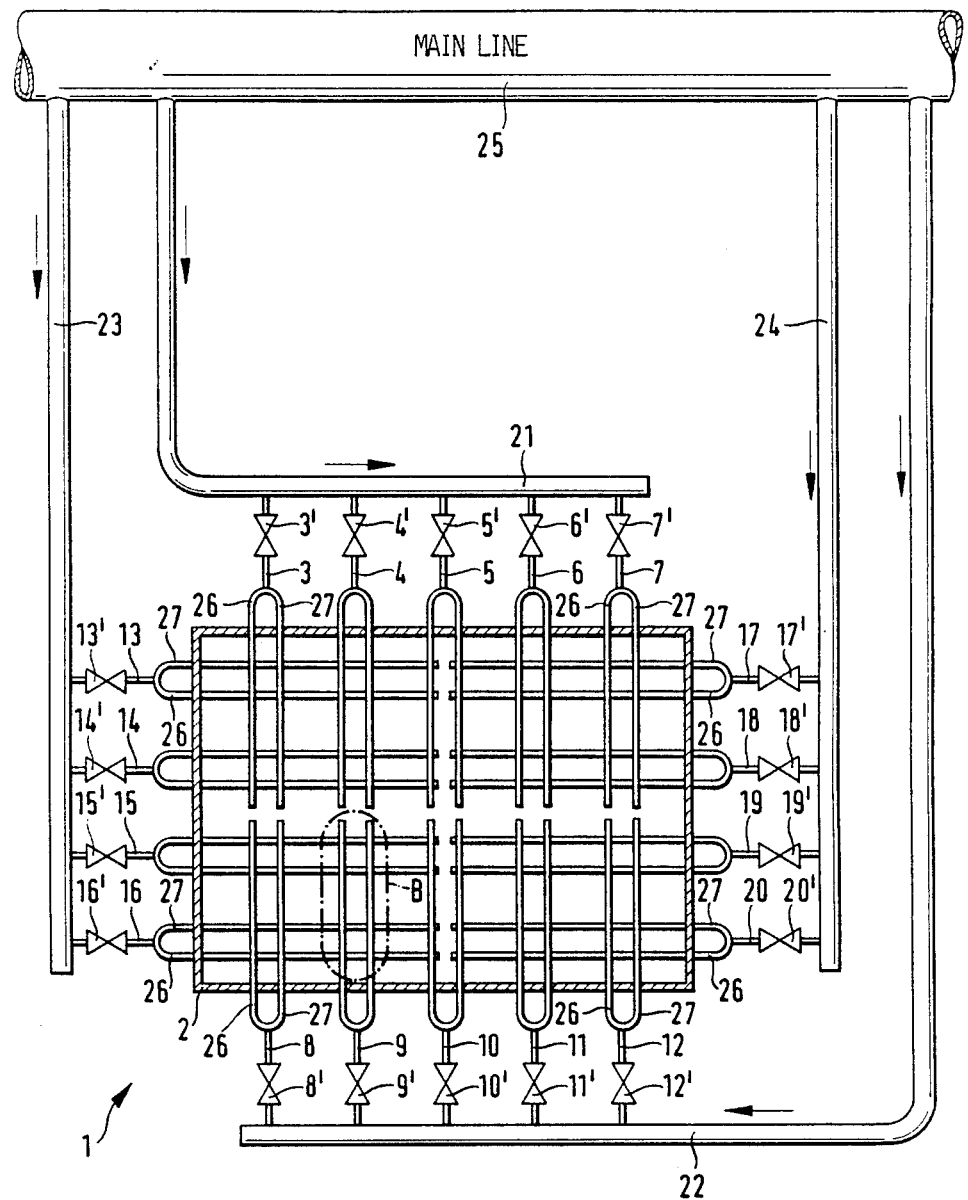
FIG. 1 shows a schematic cross section of a flue gas duct including an overall configuration of the preferred apparatus.

As seen in FIG. 1, there is included apparatus which provides an overall configuration for insuring proper introduction of a reducing agent into the flue gas flowing through a flue gas duct 1. However, to better understand the overall configuration and reduction method employed, it is best to discuss additional features of the invention as generally shown in the schematic view of FIG. 5.

As seen in FIG. 5, flue gases flow through a flue gas duct 1 from an inlet 30 to an outlet 32. The flue gas duct 1 includes a wall 2 and houses therein a catalytic device or reactor 34, which is well known in the flue gas art. Upstream of the catalytic device 34 is a first cross-sectional plane 36 and, still further upstream, a second cross-sectional plane 38 of the flue gas duct 1. Basically, the cross-sectional plane 36 includes the distribution tube segments 26, 27 of the distributor tubes 3 through 12 while the cross-sectional plane 38 includes the distribution tube segments 26, 27 of the distributor tubes 13 through 20. For the purposes of demonstration of the preferred invention, only the distributor tubes 3, 8, 13, 14, 15, and 16 are shown since these distributor tubes are located to the left of the flue gas duct 1 as generally shown in FIG. 1.

As will be seen in the discussion hereinbelow, the cross-sectional plane 36 is basically divided into a plurality of predetermined portions or zones which are generally aligned with the distribution tube segments 26, 27 of the distributor tubes 3 through 12 which directly introduce the reducing agent to the cross-sectional plane 36. However, as will also be discussed hereinbelow, the predetermined portions or zones of the plane 36 tend to extend from the upper and lower wall portions of the flue gas duct 1 so that each of the predetermined portions or zones is oblong and extends from its adjacent wall to the center region of the flue gas duct 1.

Since variations in the nitrogen oxide concentrations, the velocity of the flue gas and the concentration of the oxygen within the flue gas can exist throughout the cross-sectional plane 36, an "effective" concentration of the nitrogen oxides within each predetermined portion or zone (and within parts of each predetermined portion or zone) may vary throughout the cross-sectional plane 36.

In order to determine the "effective" concentration of nitrogen oxides generally at the cross-sectional plane 36 within each one of the predetermined portions or zones, the preferred invention includes the use of a plurality of sensing elements 40 through 46 which are generally aligned with particular predetermined portions or zones of the cross-sectional plane 36. These sensors or sensing elements 40 through 46 are capable of determining the actual concentration of the nitrogen oxides, the flue gas velocity and the oxygen concentration from which the "effective" concentration of nitrogen oxides can be determined. It should be noted that although these sensors would be in an array which extends across the entire cross-sectional plane 36, only those generally at the left of the cross-sectional plane 36 as generally seen in FIG. 1 are included for the purposes of demonstration. As a result, the sensors 40, 42 would be generally aligned with the predetermined portion or zone aligned with the distribution tube segments 26, 27 of the distributor tube 3 while the sensors 44, 46 would be generally aligned with the distribution tube segments 26, 27 of the distributor tube 8. While only one sensor for determining the effective concentration of the nitrogen oxides might be utilized for each predetermined portion of the cross section 36, the use of two or more sensors for each predetermined portion enables the effective concentration of nitrogen oxides to be determined within parts of each predetermined portion or zone. If the preferred invention were to include only the distributor tubes 3 through 12, the additional sensors would not be necessary. However, with the additional, distributor tubes 13 through 20 which tend to run perpendicular to the distributor tubes 3 through 12, the use of more than one sensor within the predetermined portion or zone allows a more accurate determination of the effective concentration of nitrogen oxides in specific locations within each of the predetermined portions.

After the effective concentration of nitrogen oxides for each predetermined portion (or a part thereof) has been determined, the information is provided to an overall Reducing Agent Control System. Generally, the embodiment shown in FIG. 5 is directed to a more sophisticated manner of controlling the quantity of reducing agent to each predetermined portion of the cross section 36. Specifically, the preferred method shown in FIG. 5 causes the information obtained from the various sensors 40 through 46 to be analyzed within the Reducing Agent Control System for producing proper control and regulation of the quantity of reducing agent introduced to the flue gas through the distributor lines 3, 8, 13, 14, 15 and 16. As will be seen, corresponding control valves 3', 8', 13', 14', 15' and 16' in their respective distributor lines are capable of being regulated and adjusted for controlled introduction of the reducing agent generally to the cross section 36. Depending on the particular form of the Reducing Agent Control System, the system may include the establishment of fixed quantities of the reducing agent for introduction to the flue gas at the distributor tubes 13 through 16 while maintaining variations in the quantities of the reducing agent at the distributor tubes 3, 8. On the other hand, because these sensors 40 through 46 may sense different effective concentrations of nitrogen oxides within each half or part of a particular predetermined portion or zone, further adjustment of the distributor tubes 13 through 16 may also be appropriate for the effective reduction of the nitrogen oxides within the crosssectional plane 36.

It should be recognized that a less sophisticated means could be employed to basically accomplish the same results of the embodiment shown in FIG. 5. While the preferred method shown in FIG. 5 could include various types of controls to automatically and continuously vary the quantity of reducing agent introduced to each predetermined portion (or even each half thereof), if the effective concentration of nitrogen oxides does not vary significantly during the operation of the flue gas duct, a simpler, yet practical alternative system might be employed.

For example, it might be possible to simply premeasure the effective concentration of nitrogen oxides in each predetermined portion or zone or in parts or halves thereof at the initial start-up and introduction of the apparatus to the flue gas system. With a simplified system of this type, an individual sensor could be moved to the various predetermined portions or zones of the cross section 36 and the various control valve means in each of the distributor lines 3 through 20 could be regulated or adjusted for controlling the desired quantity of reducing agent for the various distribution tube segments 26, 27. Although in the most simplified system of this type, only the distributor tubes 3 through 12 would be utilized to generally uniformly distribute the reducing agent to the entire oblong-shaped predetermined portion or zone aligned therewith, the use of the additional distributor tubes 13 through 20, which are in the cross section 38 and perpendicular thereto, could provide finer adjustment in order to control the quantity of reducing agent within each predetermined portion and also within specific parts or halves of each predetermined portion.

Having explained the overall apparatus and method for introducing reducing agent to the flue gas, it is appropriate to further discuss the details of the invention as shown in FIGS. 1 through 4. Specifically, as shown in FIG. 1, the reducing agent is introduced to the flue gas duct 1 at the cross-sectional planes 36, 38 upstream of the catalytic device or reactor 34. Within the interior of the flue gas duct 1, the nitrogen oxides are removed by means of the catalyst as the reducing agent is introduced into the flue gas. As mentioned above, the reducing agent might include ammonia or an ammonia-air mixture.

In the flue gas duct 1, there are distributor tubes 3 to 12 aligned with the first cross-sectional plane 36. Distributor tubes 13 to 20 are aligned with a parallel, second cross-sectional plane 38 which is upstream or to the left of the plane 36 as shown in FIG. 5. Each distributor tube 3 to 20 is connected by means of its own control valve 3' to 20' to one of four feed lines 21, 22, 23 or 24. The feed lines, for their part, are connected to a main line 25.

Each distributor tube 3 to 20 has two distribution tube segments 26, 27 running parallel to one another in the corresponding cross-sectional planes 36, 38. The distribution tube segments 26, 27 branch off in a fork-like fashion from the related control valve, so that the distributor tubes have an overall fork shape. As a result, each distributor tube 3 to 20 has two parallel distribution tube segments 26, 27 through which the reducing agent is specifically distributed to the interior of the flue gas duct 1. As an alternative, it should be recognized that it would be possible to have each distributor tube formed by three or more parallel distribution tube segments.

Alternatively, distributor tubes could be located in sequential cross-sectional planes, which comprise varying numbers of distribution tube segments. For example, in the subsequent cross-sectional plane, there could be distributor tubes which each have one tube segment more than the distributor tubes in the preceding cross section plane.

The preferred distribution tube segments 26, 27 of the distributor tubes 3 to 12 extend from the edge or side to the center of the flue gas duct 1. Consequently, in the plane 36, the two distribution tube segments of each of the distributor tubes 3 to 7 are respectively aligned in pairs with the two distribution tube segments of each of the distributor tubes 8 to 12 as each pair of two distribution tube segments combines to extend across the flue gas duct. The same is true for the distributor tubes 13 to 20 of the neighboring cross-sectional plane 38. The distribution tube segments 26, 27 of the distributor tubes 3 to 12 and the distribution tube segments 26, 27 of the distributor tubes 13 to 20 are arranged so that the tube segments of the one plane 36 run crossways or perpendicular to the tube segments of the other plane 38 as seen in FIG. 1.

As best seen in FIGS. 2, 3 and 4, the distribution tube segments 26, 27 have nozzle openings 28, which are oriented in the direction of flow of the flue gas to be conducted through the flue gas duct. The distribution tube segments 26, 27 are also provided, between the nozzle openings 28, with pairs of nozzle openings 29, which are oriented at an acute angle to the direction of flow. The nozzle openings 28 of each distribution tube segment 26 are offset in the gaps between the nozzle openings 28 of each adjacent distribution tube segment 27. As best seen in FIG. 2, the same is true for the pairs of nozzle openings 29 which are located between the nozzle openings 28 on their respective distribution tube segments 26, 27.

As a result, nozzle jets 28' are formed at the nozzle openings 28, and nozzle jets 29' are formed at the nozzle openings 29. The distance between the distribution tube segments 26, 27 is designed so that the nozzle jets 28', 29' cover completely and uniformly the entire space between the distribution tube segments 26, 27 and the space running alongside the distribution tube segments 26, 27. The result is that during operation of each distributor tube 3 to 20, by means of its distribution tube segments 26, 27, a wide, striped zone or portion is covered with reducing agent. As seen in FIG. 1, one such zone B represents the portion of the cross-sectional plane 36 affected by the distribution tube segments 26, 27 of the distributor tube 9. The resulting generally rectangular or oblong zones of the distributor tubes 3 to 12 and 13 to 20 are close up against one another so that all of the zones or portions would respectively combine to cover the entire cross-sectional planes 36, 38.

It is important to understand the operation of the flue gas duct 1 described above if one is to appreciate the significance of the various zones produced by the distribution tube segments 26, 27. If the flue gas duct 1 is carrying a stream of flue gas with a nitrogen oxide concentration distributed uniformly over the cross section, all the control valves 3' to 20' would be open to the same width so that a uniformly distributed reducing agent or ammonia injection is achieved.

If, on the other hand, for example, there is an increased effective concentration of nitrogen oxides in the oblong zone B of the plane 36, the control valve 9' is initially opened wider, so that an increased injection of reducing agent or ammonia takes place via the distributor tube 9. Additionally, the control valve 15' and/or the control valve 16' may also be opened wider to further increase the injection of reducing agent or ammonia from the distributor tubes 15 and/or 16. Singly or in combination, the distributor tubes 9, 15, and 16 essentially coincide with the zone B and with the parts or halves thereof.

Because the distribution tube segments 26, 27 of each distributor tube 3 to 20 extend only to the center of the flue gas duct 1, and cover a wide area, it is possible by means of an appropriate setting of the control valves 3' to 20' to set an increased reducing agent or ammonia injection to respond to the current fluctuations of the effective concentration of nitrogen oxides in various zones or parts of zones throughout the cross section in the planes 36 and/or 38. The preferred setting or control of the individual valves 3' to 20' can be produced without causing an increased injection of reducing agent or ammonia in those areas or zones or parts of zones in which it is unnecessary.

It should be recognized from the description provided that various alternative embodiments could be employed to practice the invention. For example, it would be possible for the distribution tube segments in neighboring planes to not run crossways to one another but to run parallel to one another. The invention as described hereinabove in the context of a preferred embodiment is not to be taken as limited to all of the provided details thereof, since modifications and variations thereof may be made without departing from the spirit and scope of the invention.

What is claimed is:

1. A method of reducing nitrogen oxides in flue gas comprising the steps of:
    flowing said flue gas through a flue gas duct having at least one cross section;
    establishing a plurality of cross-sectional portions of said cross section which said plurality of said cross-sectional portions are combined to form said cross section;
    determining for each of said cross-sectional portions an effective concentration of said nitrogen oxides within said flue gas in said each of said cross-sectional portions;
    distributing a reducing agent into said flue gas flowing through said each of said cross-sectional portions;
    said distributing of said reducing agent including controlling a quantity of said reducing agent distributed to said each of said cross-sectional portions which said quantity corresponds to said effective concentration of said nitrogen oxides as determined for said each of said cross-sectional portions; and
    passing said flue gas with said reducing agent therein to a catalytic means downstream of said cross section to cause said quantities of said reducing agent to reduce said effective concentrations of said nitrogen oxides.

2. The method according to claim 1, wherein said determining of said effective concentration of nitrogen oxides in said each of said cross-sectional portions includes sensing an actual concentration of nitrogen oxide, sensing a flue gas velocity and sensing an oxygen concentration in said each of said cross-sectional portions.

3. The method according to claim 1, wherein said determining of said effective concentration of said nitrogen oxides includes locating at least one sensor means in said each of said crosssectional portions in said cross section of said flue gas duct.

4. The method according to claim 1, wherein said distributing of said reducing agent includes supplying said reducing agent through a plurality of openings in distributor tubes which said openings are aligned with and in a generally evenly spaced relationship to said each of said cross-sectional portions.

5. The method according to claim 4, wherein said controlling of said quantity of said reducing agent includes regulating said supplying of said reducing agent to said plurality of said openings for said each of said cross-sectional portions.

6. The method according to claim 4, wherein said supplying of said reducing agent includes simultaneously feeding said reducing agent to at least two of said distributor tubes which are parallel to each other and extend from an edge of said flue gas duct to the center thereof to be aligned with said each of said cross-sectional portions having an oblong shape.

7. The method according to claim 4, wherein said supplying of said reducing agent is through said plurality of said openings in two groups of said distributor tubes, a first of said two groups of said distributor tubes being located at said cross section and including said distributor tubes extending in a first direction, a second of said two groups of said distributor tubes being located in another cross section and including said distributor tubes extending in a second direction, said another cross section being upstream of said cross section, and said first direction being perpendicular to said second direction.

8. The method according to claim 4, wherein said supplying of said reducing agent through said plurality of said openings includes dispersing said reducing agent throughout said each of said cross-sectional portions.

9. The method according to claim 8, wherein said flowing of said flue gas is in a downstream direction which is generally perpendicular to said cross section and said dispersing of said reducing agent includes orienting at least a first group of said openings at acute angles with respect to said downstream direction.

10. The method according to claim 9, wherein said dispersing of said reducing agent includes orienting a second group of said openings in a said downstream direction.

11. The method according to claim 5, wherein said determining of said effective concentration of nitrogen oxides in said each of said cross-sectional portions includes sensing an actual concentration of nitrogen oxide, sensing a flue gas velocity and sensing an oxygen concentration in said each of said cross-sectional portions.

12. The method according to claim 5, wherein said determining of said effective concentration of said nitrogen oxides includes locating at least one sensor means in said each of said crosssectional portions in said cross section of said flue gas duct.

13. The method according to claim 5, wherein said supplying of said reducing agent through said plurality of said openings includes dispersing said reducing agent throughout said each of said cross-sectional portions.

14. The method according to claim 13, wherein said flowing of said flue gas is in a downstream direction which is generally perpendicular to said cross section and said dispersing of said reducing agent includes orienting at least a first group of said openings at acute angles with respect to said downstream direction.

15. The method according to claim 14, wherein said dispersing of said reducing agent includes orienting a second group of said openings in a said downstream direction.

16. The method according to claim 11, wherein said determining of said effective concentration of said nitrogen oxides includes locating at least one sensor means in said each of said cross-sectional portions in said cross section of said flute gas duct;

said supplying of said reducing agent through said plurality of said openings includes dispersing said reducing agent throughout said each of said cross-sectional portions;

said flowing of said flue gas is in a downstream direction which is generally perpendicular to said cross section;

said dispersing of said reducing agent includes orienting at least a first group of said openings at acute angles with respect to said downstream direction; and said dispersing of said reducing agent includes orienting a second group of said openings in a said downstream direction.

17. The method according to claim 16, wherein said supplying of said reducing agent includes simultaneously feeding said reducing agent to at least two of said distributor tubes which are parallel to each other and extend from an edge of said flue gas duct to the center thereof to be aligned with said each of said crosssectional portions having an oblong shape.

18. The method according to claim 16, wherein said supplying of said reducing agent is through said plurality of said openings in two groups of said distributor tubes, a first of said two groups of said distributor tubes being located at said cross section and including said distributor tubes extending in a first direction, a second of said two groups of said distributor tubes being located in another cross section and including said distributor tubes extending in a second direction, said another cross section being upstream of said cross section, and said first direction being perpendicular to said second direction.

* * * * *